(12) United States Patent
Hartog

(10) Patent No.: US 7,995,209 B2
(45) Date of Patent: Aug. 9, 2011

(54) TIME DOMAIN MULTIPLEXING OF INTERFEROMETRIC SENSORS

(75) Inventor: Arthur H. Hartog, Winchester (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 266 days.

(21) Appl. No.: 12/245,921

(22) Filed: Oct. 6, 2008

(65) Prior Publication Data
US 2010/0085572 A1 Apr. 8, 2010

(51) Int. Cl.
*G01B 9/02* (2006.01)
(52) U.S. Cl. ........................................ 356/478
(58) Field of Classification Search .......... 356/477–480, 356/35.5
See application file for complete search history.

(56) References Cited

U.S. PATENT DOCUMENTS

| | | |
|---|---|---|
| 5,010,555 A | 4/1991 | Madey |
| 6,496,261 B1 | 12/2002 | Wilsher |
| 7,254,289 B2 | 8/2007 | Wait |
| 2006/0010973 A1 | 1/2006 | Brown |
| 2006/0146337 A1 | 7/2006 | Hartog |
| 2007/0126594 A1 | 6/2007 | Atkinson |
| 2008/0149819 A1 | 6/2008 | Zhdaneev |

FOREIGN PATENT DOCUMENTS

| | | |
|---|---|---|
| GB | 2433112 | 6/2007 |
| GB | 2433115 | 6/2007 |
| GB | 2440351 | 1/2008 |
| WO | 2008012497 | 1/2008 |
| WO | 2008012500 | 1/2008 |

*Primary Examiner* — Hwa S. A Lee
(74) *Attorney, Agent, or Firm* — Brandon S. Clark; Rodney Warfford

(57) ABSTRACT

An optical sensor array includes a plurality of interferometric sensors that are disposed at a plurality of locations in a region of interest. To determine a physical parameter at the plurality of locations, the array is interrogated with a plurality of optical pulses covering a range of optical wavelengths. The signals returned in response to the interrogating pulses are analyzed to determine an optical path imbalance associated with each sensor, where the optical path imbalance bears a relationship to the physical parameter of interest. Each sensor's contribution to the returned signals is determined by measuring the transit time between the launching of the interrogating pulses and the detection of the returned signals. By determining each sensor's contribution, the physical parameter may be determined at each of the plurality of locations.

19 Claims, 5 Drawing Sheets

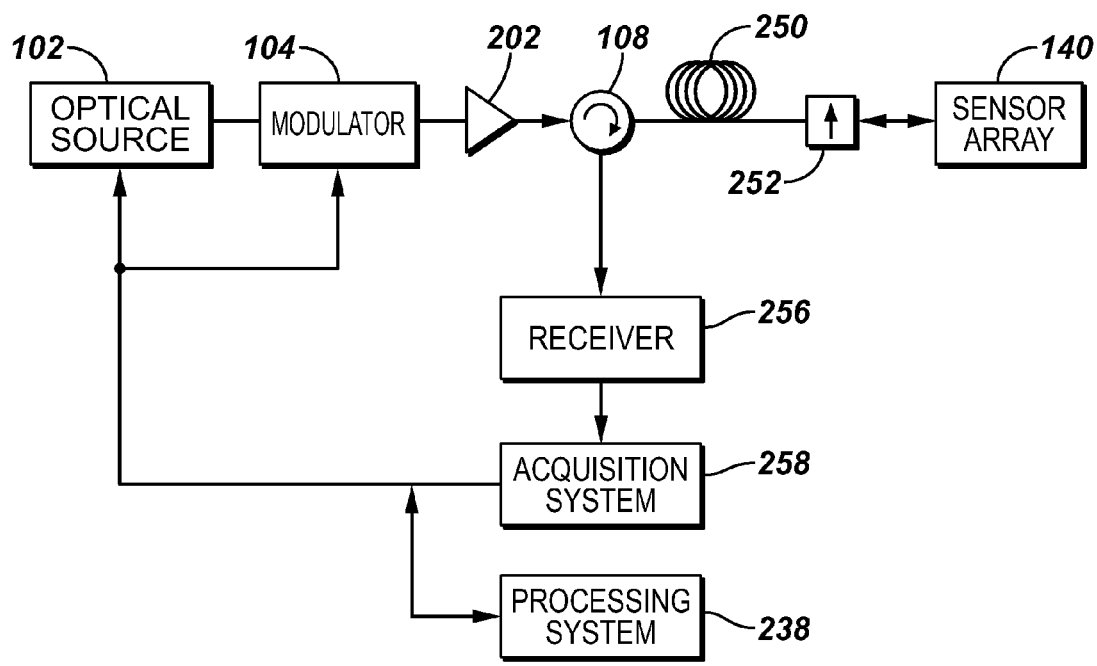
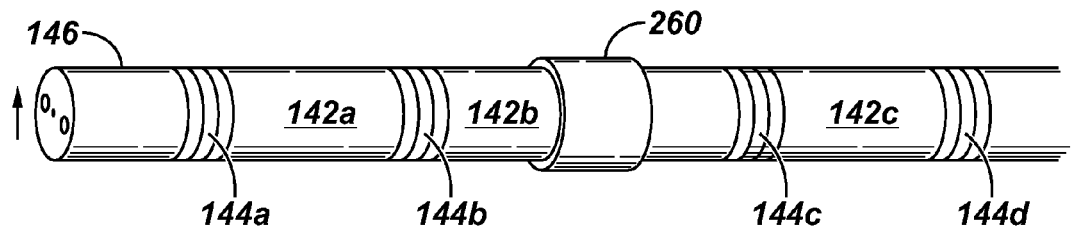

TIME DOMAIN MULTIPLEXING OF INTERFEROMETRIC SENSORS

BACKGROUND

Interferometric sensors may be used to measure a variety of different physical parameters. For instance, an interferometric sensor may be used with an optical fiber that is deployed through a region of interest. When light is launched into the fiber, the sensor (or reflector) returns backreflected optical radiation that then may be analyzed to determine variations in a parameter of interest, such as pressure, temperature, strain, etc. Such sensors have proven to be useful in a variety of applications, such as in oil production, to identify and determine a variety of downhole properties, such as pressure, vibration, temperature, fluid flow characteristics, etc.

An interferometric sensor may be deployed as a single point sensor, such as a sensor that is located at the end of an optical fiber. The returned light then provides information corresponding only to the location at which the sensor is positioned. In applications in which multiple data points are desired, a plurality of optical fibers may be deployed through the region of interest, each of which contain a discrete sensor. In such applications, separate interrogation and acquisition equipment arrangements are required for each fiber, thus increasing the cost and complexity of the overall system.

Interferometric sensors also may be arranged in an array of discrete sensors deployed at intervals along the length of the optical fiber. Acquisition of information from such arrays requires the ability to distinguish the returned light from each reflector. In certain types of arrays, the reflectors are wavelength encoded, meaning that each reflector responds to an interrogation pulse having a particular optical wavelength. In such a case, the returned light may be wavelength multiplexed in order to identify the particular reflector from which the returned signal was received. However, wavelength multiplexing schemes do not provide location information. Thus, in addition to any inherent imprecision in knowing the exact location of a reflector that corresponds to a particular wavelength, any ambiguity in the returned optical signals may make identification of the corresponding reflector difficult. Yet further, interrogation of such arrays requires that each reflector respond to a different wavelength, thus excluding the implementation of arrays of identical sensors. Thus, systems which implement wavelength multiplexing schemes may not be optimal for all applications.

SUMMARY

In accordance with one embodiment of the invention, a method for determining a physical parameter in a region of interest comprises launching a plurality of optical pulses into an optical sensor array having a plurality of interferometric sensors disposed at a plurality of locations in a region of interest, analyzing returned signals produced in response to the optical pulses in a time domain to identify each sensor's contribution to the returned signals, and analyzing each sensor's contribution in a wavelength domain to determine an optical path length imbalance associated with each sensor. The method further comprises determining a physical parameter at the plurality of locations in the region of interest based on the optical path length imbalances.

In accordance with another embodiment of the invention, a system for determining a physical parameter associated with a region of interest comprises an optical sensor array comprising a plurality of interferometric sensors disposed at a plurality of locations within a region of interest, and an optical source for launching a plurality of optical pulses into the sensor array at a plurality of optical wavelengths. The system also includes an acquisition and processing system coupled to the optical sensor array and configured to analyze returned signals produced in response to the optical pulses to determine each sensor's contribution to the returned signals based on a transit time between launching an optical pulse and receiving a returned signal in response to the optical pulse, and to determine an optical path length imbalance associated with each sensor based on each sensor's contribution. The acquisition and processing system is further configured to determine at least one physical parameter at the locations in the region of interest based on the optical path length imbalances.

Other or alternative features will become apparent from the following description, from the drawings, and from the claims.

BRIEF DESCRIPTION OF THE DRAWINGS

FIG. 6 is a block diagram of another exemplary time domain multiplexing system, in accordance with an embodiment of the invention.

FIG. 7 is another exemplary embodiment of a polarimetric birefringement sensor array, in accordance with the invention.

DETAILED DESCRIPTION

Figure 1:
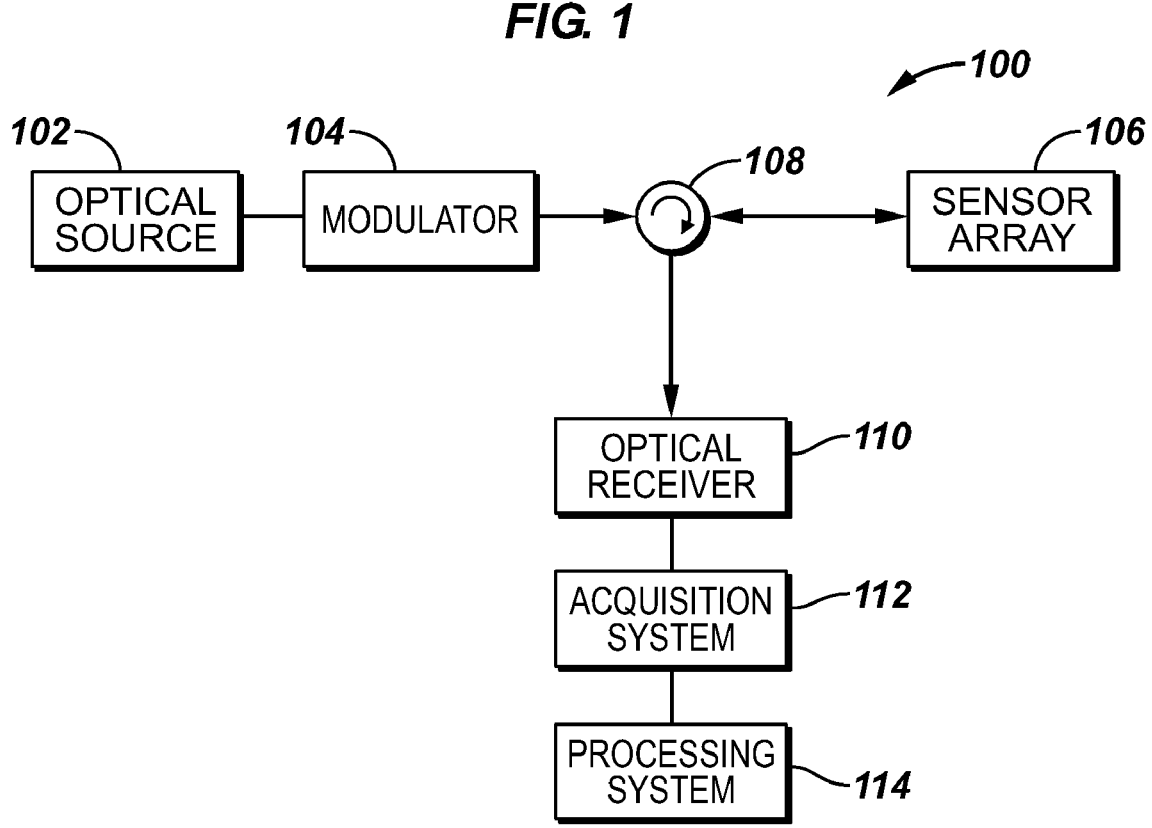
FIG. 1 is a block diagram of an exemplary time domain multiplexing system for a sensor array in accordance with an embodiment of the invention.

In the following description, numerous details are set forth to provide an understanding of the present invention. However, it will be understood by those skilled in the art that the present invention may be practiced without these details and that numerous variations or modifications from the described embodiments are possible. In particular, many of the examples used are based on polarimetric sensors, which are a special case of interferometric sensors, in which the two arms of the interferometer correspond to the principal states of polarization within the sensor. However, the principles disclosed herein are also applicable to short path imbalance interferometers, i.e., interferometers where the difference in the optical path length between the two arms is short, for example less than 0.5 meter.

A polarimetric sensor is based on a transduction mechanism that involves modulating the state of polarization within the sensor. In general, such sensors have a short path imbalance, i.e., they exhibit birefringence and the difference in optical path length between the fast axis and the slow axis is typically a few hundred microns. One technique for interrogating such a sensor is to measure its response to a range of wavelengths. Similarly, other short path imbalance interferometers, such as extrinsic Fabry-Perot interferometers, can also be interrogated by illuminating them with a range of wavelengths (i.e., broadband light) and observing the modulation of the spectrum that they produce. In either case, the sensor can be configured in reflective mode (where the signal returns through the same fiber end as was used to inject the interrogating light) or in transmissive mode (where the light emerges from the end opposite to the launching end).

When interrogated with broadband light, a short path imbalance interferometric sensor returns a spectrum that is modulated by a function that is dependent on the measurand; typically, the spectrum is modulated (multiplied) by a sinusoidal function, the frequency and phase of which is a function of the measurand (e.g., temperature, pressure, strain, etc.). Thus, variations in a particular state, or measurand, of interest, may be determined by detecting changes in the signal returned from a particular sensor. For polarimetric sensors, variations in the measurand are indicated by a modulation of the light traveling through the sensor through a measurand-dependent variation in the birefringence of the sensor. These changes in polarization may be converted to electrical signals indicative of intensity changes by a detection and data acquisition system. The electrical signals may then be processed to provide information regarding the measurand. When multiple sensors are arranged in an array, the extraction of useful information requires identification of each sensor's contribution to the combined signal. Identification of each sensor's contribution may be performed based on the round trip transit time between the launching of an interrogating pulse of a known wavelength and the detection of a returned signal produced in response to the interrogating pulse.

Polarimetric sensors may be configured to respond to optical light of a particular wavelength. Thus, sensor arrays may include multiple polarimetric sensors that each are configured to respond to a different wavelength, providing for separation of each sensor's contribution through wavelength multiplexing techniques. However, any ambiguities in the returned combined signal may create difficulties in separating out the contributions from each sensor. In addition, wavelength multiplexing techniques will not work for arrays in which all sensors are of like construction (i.e., respond to the same wavelength), since any further wavelength extension will be intractable. However, when an array of sensors is deployed through a region of interest, the sensors generally will be disposed at different locations within the region and, thus, at different distances from the interrogation and acquisition equipment. The techniques disclosed herein exploit these differences in the locations of the respective sensors to distinguish their respective contributions to the returned signal based on a determination of each sensor's location in the region of interest. More specifically, the sensors may be distinguished based on measuring the transit time of an optical signal between the interrogation equipment and the detection equipment.

The transit time of the optical signal may be addressed directly in the time domain in a manner similar to that of optical time domain reflectometry (OTDR). In OTDR, an interrogating pulse of light is launched into an optical fiber and the returned signal is acquired as a function of time since the launching of the interrogation pulse. The transit time then is used to determine position information along the fiber. Thus, when multiple sensors are arranged in an array, the identification of the contribution from each sensor in the array to the returned combined signal may be determined using a time domain multiplexing technique, as will be further illustrated below.

Referring now to FIG. 1, a time domain multiplexing system 100 in accordance with an embodiment of the invention is illustrated. System 100 includes an optical source 102 having an output that is modulated by a modulator 104 (e.g., an acousto-optical modulator) into a series of pulses. The minimum spacing between the pulses is dictated by the round-trip transit time between the nearest and the most remote sensor in the array. The pulses are launched into a sensor array 106 through a coupling device 108, such as an optical circulator, which efficiently couples the pulses both from the source 102 to the array 106 and from the array 106 to an optical receiver 110. The receiver 110 detects and amplifies the returned light and passes the resulting electrical signal to an acquisition system 112, which may include, for instance, an analog-to-digital (A/D) converter. The digitized data may then be stored in and processed by a processing system 114.

In the embodiment illustrated, for equal power launched, the optical power returned from the sensor array 106 necessarily is weaker than that returned when only a single point sensor is deployed. Typically, in a system optimized for maximum returned power, the fraction of the optical power returned by each sensor is proportional to the inverse square of the number of sensors that are interrogated. In addition, because of the pulsed nature of the interrogation technique, only a small fraction of the average source power is launched into the array 106. Yet further, because of the use of multiple sensors, the bandwidth of the acquisition system 112 generally is much higher than the bandwidth of an acquisition system used with only a single point sensor. The combination of these effects results in a reduced signal-to-noise ratio (SNR) as compared to a single point system.

To counteract the degradation in SNR, the optical source 102 is a tunable laser (e.g., a distributed feedback diode laser) such that the entire spectral output of the source 102 may be used at any given time. To further enhance the SNR, the optical receiver 110 may include an avalanche photodiode having an internal gain that may result in a 3-5 dB improvement in the SNR.

In some embodiments, additional power may be provided to the sensor array 106 through optical amplification. However, most known optical amplifiers have a limited wavelength range, which limits the use of an optical amplifier to systems that can be interrogated with that limited wavelength range. As an alternative, Raman amplification may be used, which does offer a larger wavelength range, but with a tradeoff in terms of efficiency.

Figure 2:
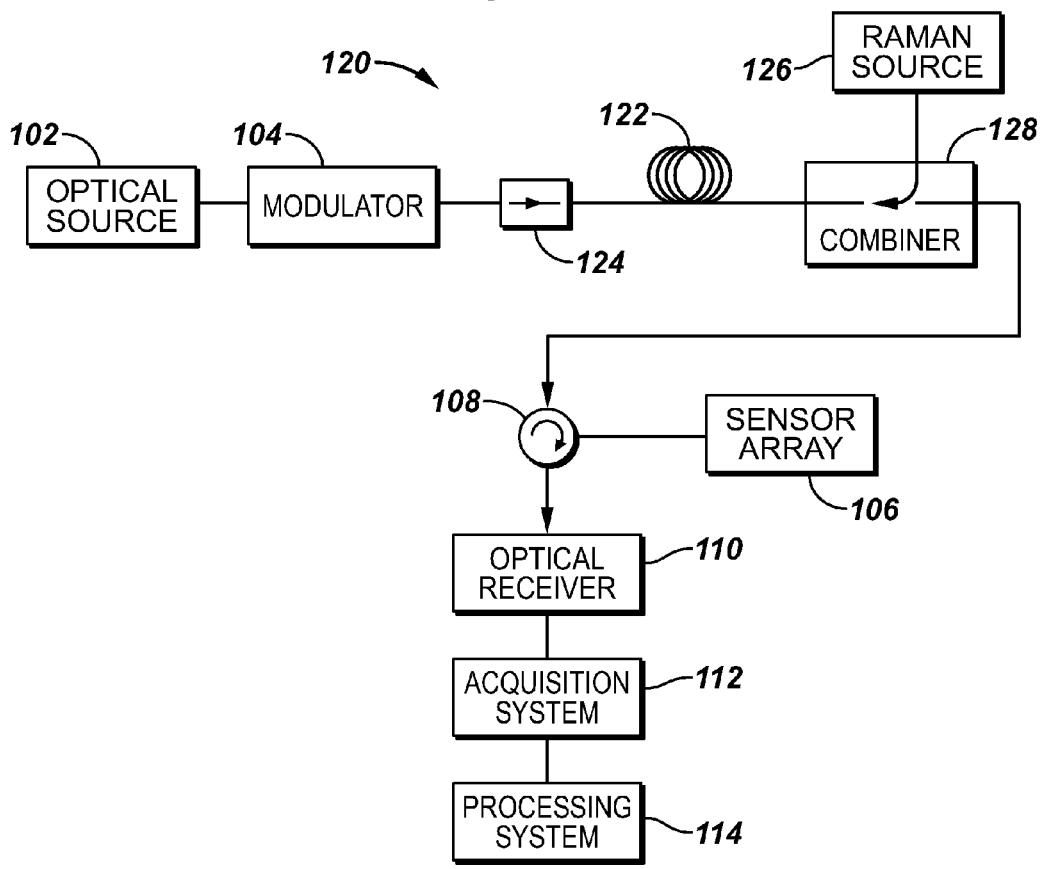
FIG. 2 is a block diagram of an exemplary time domain multiplexing system for a sensor array in accordance with another embodiment of the invention.

An arrangement 200 using Raman amplification is illustrated in FIG. 2. Here, the optical source 102 and modulator 104 are coupled to a Raman gain fiber 122 through a directional coupler 124. A Raman source 126 (e.g., one or more high power laser diodes) is coupled to the Raman gain fiber 122 through a combiner 128, and the power from the combined sources 102 and 126 are coupled to the sensor array 106 through the circulator 108. The level of gain provided by the combined sources 102 and 126 is sufficient to boost the peak power provided to the sensor array 106, but is maintained below the threshold that will generate stimulated Raman scattering. The Raman gain occurs at a frequency that is approximately 13 THz lower than the Raman pump frequency and typically has a gain bandwidth of approximately 6-7 THz. For a signal at 1550 nanometers (approximately 193.42 THz), the pump wavelength having the highest Raman gain is around 1452 nanometers and the gain bandwidth is about 50 nanometers. This range can be extended by multiplexing multiple pump sources each operating at different wavelengths to cover the desired band. In such an embodiment, it may be desirable to turn the Raman pump sources on and off according to the current wavelength of the signal to be amplified.

Other types of amplifiers may be used in the system illustrated in FIG. 2. For instance, the Raman gain amplifier 122 and combiner 128 may be replaced with an Erbium-doped amplifier.

In any of the embodiments of the time domain multiplexing systems discussed herein, the sensor array 106 is interrogated by selecting the optical wavelength of the source 102, and then pulsing the source 102 output signal. As discussed previously, the pulse repetition frequency of the pulses is dependent on the distance between the nearest and most remote sensor in the array. The duration of individual pulses is selected to be less than the round trip transit time between adjacent sensors. After the returned light is received from all sensors in the array 106, the source wavelength is adjusted and another pulse is launched. The process is repeated until the entire wavelength range of interest has been covered. For instance, in one embodiment, a wavelength range of 80 nanometers centered about a 1570 nanometer optical wavelength is used, and the optical wavelength is adjusted in steps of typically 0.1 nanometer.

The wavelength range and sampling interval in the wavelength domain depend on the optical path imbalance of the sensor. As mentioned earlier, the wavelength-response of each sensor takes the form of the source spectrum, modulated by a sinusoidal-like function, the frequency and phase of which, combined, allow the optical path imbalance to be calculated. The greater the path imbalance, the higher the modulation frequency. In addition, the range preferably is wide enough to allow a few (e.g., 3) fringes to be observed. Yet further, the sampling interval should be sufficient to allow acquisition of at least two samples per fringe. For example, a sensor having a path imbalance of order 100 microns may be acquired with a scanning range of 80 nanometers. In this example, a sampling frequency of 1 nanometer would be sufficient. It should be understood, however, that the path imbalance is modulated by the measurand and thus the wavelength range and sampling interval should be sufficient to allow for both the maximum and minimum possible values of the path imbalance.

Figure 3:
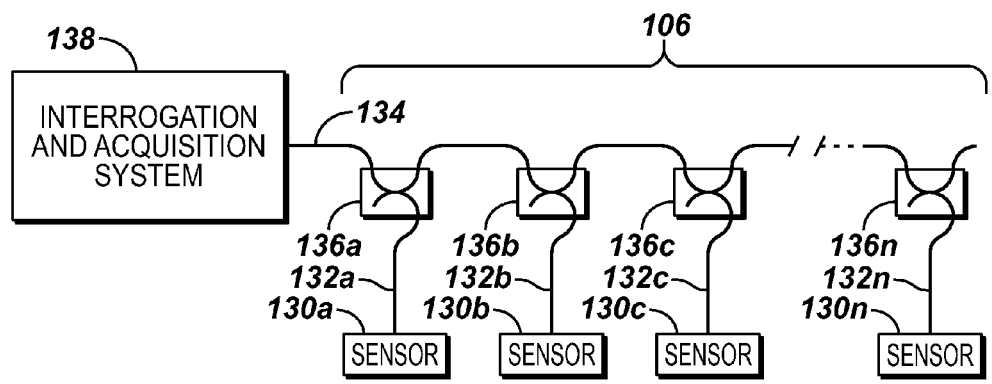
FIG. 3. illustrates an exemplary sensor array that may be used with a time domain multiplexing system, such as the systems of FIGS. 1 and 2, in accordance with an embodiment of the invention.

In one embodiment of the invention, the sensor array 106 is configured as a plurality of discrete polarimetric sensors 130a-n arranged in parallel by tapping a plurality of optical fibers off a fiber backbone or down lead 134 that is deployed in a region of interest. Such an arrangement is shown in FIG. 3, in which the sensors 130a-n each occupies the end of a corresponding optical fiber 132a-n. The fibers 132a-n are connected at spaced apart intervals along the down lead 134 via respective tap couplers 136a-n. The down lead 134 is coupled to an interrogation and acquisition system 138, which provides pulses to interrogate the sensors 130a-n and which detects the returned optical signal (i.e., the optical path imbalance for each sensor) and acquires the desired information therefrom. In a variant of this embodiment, the sensors 130a-n may be interferometric sensors. For example, each sensor 130a-n may be a low finesse Fabry-Perot etalon (sometimes referred to as a Fizeau interferometer).

Figure 4:
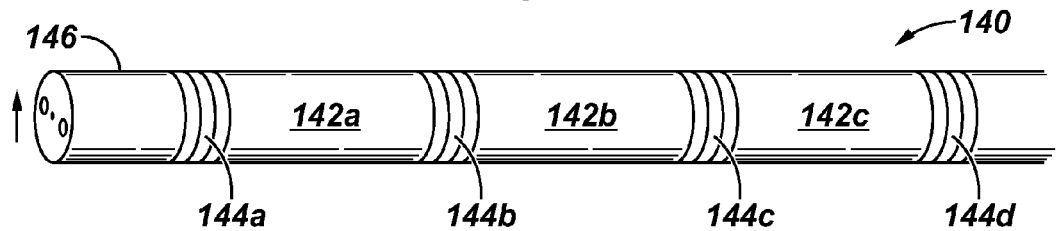
FIG. 4 is an exemplary polarimetric birefringement sensor array that may be used in conjunction with a time domain multiplexing system, in accordance with an embodiment of the invention.

In another embodiment, a reflective polarimetric sensor array 140 is employed, which is configured as a series of sections of highly-birefringent (i.e., polarization-maintaining) fibers 142a-c that are serially connected and separated by weak reflectors 144a-d. As shown in FIG. 4, the weak reflectors 144a-d may be formed, for instance, by inscribing fiber Bragg gratings at appropriate intervals along the length of a birefringent fiber 146. The output of such a sensor array is the difference in the optical path length between the two principal axes of the fiber 146 between adjacent reflectors 144a-d. The sensor array 140 may be configured such that the optical path length difference has a direct relationship with an average isostatic pressure over the length of the fiber 146. In one embodiment the polarimetric sensor array 140 may be provided by a side-hole fiber. The character of the output signal provided by the array (i.e., the period and phase in the optical frequency domain) is directly related to the cumulative path length difference between the two principal axes of the sidehole fiber.

Figure 5:
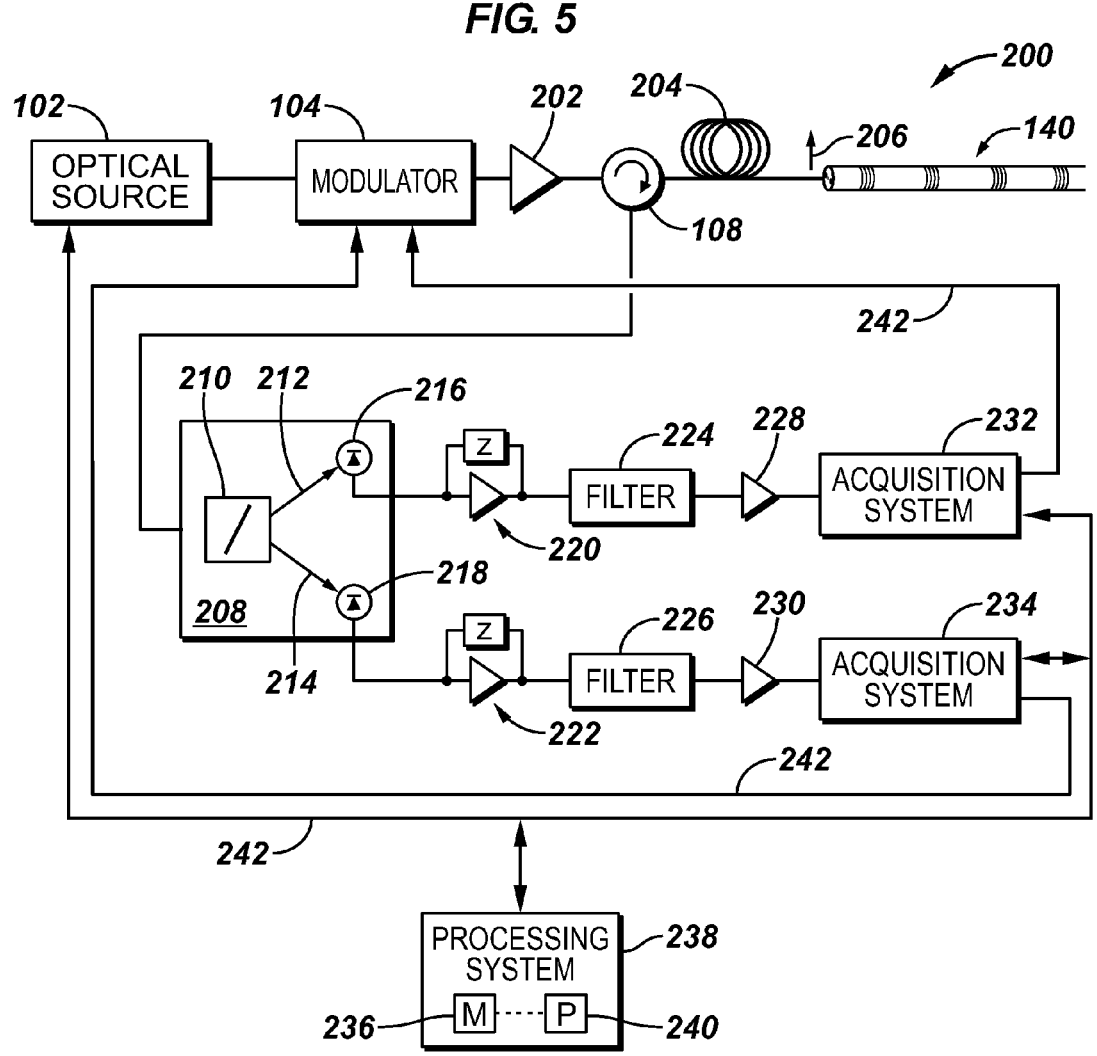
FIG. 5 is a block diagram of an exemplary time domain multiplexing system using the sensor array of FIG. 4, in accordance with an embodiment of the invention.

Referring now to FIG. 5, a time domain multiplexed interrogation and acquisition system 200 that may be employed to provide an indication of the measurand associated with the sensor array 140 of FIG. 4 is shown. In FIG. 5, the optical source 102 launches an optical interrogating pulse into the sensor array 140. The output of the optical source 102 (e.g., a tunable laser) is modulated by the modulator 104 and optionally amplified by an amplifier 202. The amplified pulse is coupled to a fiber 204 (i.e., the down lead fiber) through the circulator 108. The fiber 204 linearly polarizes the amplified interrogating pulse such that the light pulse is launched into the sensor array 140 at 45 degrees (as denoted by the arrow 206) from the principal axes of polarization of the sensor array 140. Thus, the power of the light launched into each of the axes of the sensing fiber 146 is approximately equal.

In the embodiment illustrated, the fiber 204 is a polarization-maintaining fiber; there are several types of polarization maintaining fibres that are available commercially from vendors such as Fibercore (Southampton, UK), Corning Inc (Corning, N.Y., USA) or Fujikura Ltd (Japan) In other embodiments, such as the embodiment illustrated in FIG. 6 (which will be further discussed below), the fiber 204 may be replaced with a non-polarization-maintaining fiber that is followed by a fiber polarizer. The latter may consist of, for instance, a short piece of sidehole fiber that has its holes filled with a liquid metal, which attenuates the two polarizations strongly differentially.

Referring again to FIG. 5, the sensor array 140 produces returned light in response to the interrogating pulse, which is directed to an optical receiver arrangement 208 through the circulator 108. The optical receiver arrangement 208 includes a polarization beam splitter 210 that converts the polarization changes due to the array's birefringence into an intensity measurement. In the embodiment shown, the sensor array 140 is a polarization-maintaining (e.g., high birefringence) array such that the state of polarization of the light reaching the sensor elements 142a-c is known and stable, and the distribution of the intensity of the reflected light in each of the axes may be captured. Variations of the state of the polarization in each of the axes are detected as intensity variations in the polarization beam splitter 210. In embodiment illustrated in FIG. 5, two polarization channels 212 and 214 are provided such that the state of polarization that has accumulated between the reflectors 144a-d of the sensor array 140 is detected. However, in alternative embodiments, only a single channel may be used which simply detects the state of polarization of the returned optical signal by measuring the signal transmitted through a single polarizer.

Referring still to the embodiment shown in FIG. 5, the beam splitter 208 has two orthogonal outputs, one output for each of the polarization channels 212 and 214. Each of the channels includes a photodetector 216 and 218, respectively, that generates a photocurrent in response to the light impinging on the detector. The photocurrent generated by each photodetector 216 and 218 is provided to the input of a respective amplifier 220, 222, which preferably is a transimpedance amplifier that produces an output voltage signal that is proportional to the photocurrent at the input. The voltage signals then may be filtered by filters 224 and 226 to limit the electrical signals to the frequency range of interest, boosted by amplifiers 228 and 230, respectively, and provided to acquisition systems 232 and 234. The acquisition systems 232 and 234 may include one or more analog to digital converter(s) to convert the filtered signal(s) to digital data. This data then may be stored in a memory 236 of a processing system 238, where it may be accessed by a processor 240 to provide information regarding the measured parameter of interest. More specifically, the processing system 238 may include software that is configured to determine, based on the stored data, the difference of the path imbalances for successive sensor elements 142*a-c* in the array, such that the contribution of each sensor to the cumulative polarimetric signal may be calculated. Based on this calculation, the measurand of each sensor element 142*a-c* can be determined based on the known sensitivity of the birefringence of the sensor array 140 to the measurand.

Referring now to FIG. 6, a system is shown in which the polarization-maintaining down lead 204 is replaced with a non-polarization maintaining fiber 250 and a fiber polarizer 252. In this embodiment, the fiber polarizer 252 polarizes the interrogating pulse such that it is launched into the sensor array 140 at 45 degrees to each of the principal axes of polarization of the array 140. The fiber polarizer 252 also analyzes the returned optical signal (i.e., provides an indication of the cumulative path imbalance between the principal axes of the array 140 by polarizing the returned signal such that an optical signal that is at 45 degrees to the principal axes of the array 140 is generated). The polarized signal output by the fiber polarizer 252 then is received by a receiver 256 which produces an electrical signal representative of the difference in the optical path length between the two principal axes of the array 140. An acquisition system 258 converts the signal produced by the receiver 256 into digital data which may then be stored in and processed by the processing system 238. As discussed above, since the optical path length difference between the two axes between adjacent reflectors bears a relationship to the measurand of interest (e.g., pressure, for instance), detection of a variation or modulation of the optical path length difference is indicative of variations in the measurand of interest. By using time multiplexing to separate out each sensor's contribution to the returned signal, the measurand of interest may be determined at each sensor location along the array 140. In some embodiments, a polarization-controlling device may be inserted in the launching optics (i.e. between optical source 102 and downlead fiber 250), that adjusts the polarization state of the interrogating pulses in order to maximize their transmission through polarizer 252 (and thus the strength of the signal returned to the receiver).

In various embodiments of the invention, the processing system 238 may be coupled to the acquisition systems 232, 234 (or 258 in FIG. 6) through a communication link 242, such as a network. Alternatively, the processing system 238 may be part of a control center. In one embodiment, in addition to the memory 236 and the processor 240, the processing system 238 may comprise an input device and an output device. The memory 236 may also store algorithms for determining various physical parameters associated with the sensor array 140 based on the acquired data, as well as algorithms for controlling the optical source 102 and/or the modulator 104 and/or the acquisition systems 232, 234 (or 258 in FIG. 6). For instance, such algorithms may dictate the number of pulses to launch into the sensor array 140 for each optical frequency of interest, the time between launched pulses (i.e., the pulse repetition frequency), the pulse width output by the modulator 104, the procedure for changing the optical frequency of the optical source 104 (e.g., when to adjust the frequency, the magnitude of the frequency step, etc.), etc. The input device may be a variety of types of devices, such as a keyboard, mouse, a touch screen, etc. The output device may include a visual and/or audio output device, such as a monitor having a graphical user interface.

Applications for the systems discussed above include a sensor array for measuring pressure in which the sensing fiber has a birefringence that is pressure-sensitive, such as the side-hole fiber illustrated in FIG. 4. Generally, in such applications, it may be desirable to correct the pressure measurements with a temperature measurement. However, since the birefringence of a side-hole fiber is relatively insensitive to temperature, a distributed temperature sensor may also be deployed in either the same optical fiber or in another optical fiber included in the same cable in which the fiber used for the pressure measurements is deployed. In such embodiments, a variety of known distributed temperature sensing approaches may be used, such as those based on Raman or Brillouin OTDR techniques. The wavelength of the interrogating pulses for the distributed temperature sensing generally should be different than the wavelengths associated with the reflectors 14*a-d* in order to avoid ambiguities in the measurements.

In other embodiments, temperature information may be acquired by interrogating the side-hole fiber 146 on its principal axes as opposed to 45 degrees from the axes. Such a technique may provide both local temperature and pressure measurements. However, the resolution of the pressure measurements may be reduced compared to the measurements acquired when interrogating the principal axes at 45 degrees.

In yet other embodiments, temperature compensation of the pressure measurements may be accomplished by providing separate fiber Bragg gratings specifically for temperature measurements. In such a embodiment, the functions of Bragg gratings used for an additional measurement, such as temperature, and Bragg gratings (or other reflectors) used to delineate the elements of the array should be separated. The latter gratings or reflectors may be made short enough, or chirped, such that almost arbitrary wavelength ranges may be covered. However, the spectral width of the reflector should be sufficient such that there are at least a few oscillations of the sensor response over the spectrum that is reflected to ensure that the peak frequency of the sensor may be distinguished and thus identified. For instance, for an optical wavelength of 1550 nanometers, a typical side-hole fiber has a beat length shorter than 10 millimeters. However, the fiber may be configured such that the beat length decreases with increasing pressure. Thus, for instance, for a value of 5 millimeters at normal operating pressures and a 10 meter fiber length per array element, the cumulative path imbalance for a round trip is on the order of 6 millimeters, leading to a periodicity in the frequency domain on the order of 0.4 nanometer for the first array element. Thus, the minimum spectral width of the reflectors may be a few nanometers (for example, 3 nanometers). Wider spectral ranges are preferable, however, since the wider range will facilitate more precise resolution of the optical path imbalance and thus calculation of the measurand. It should be noted that subsequent array elements will increase the cumulative path imbalance leading to requirements for increasing resolution in the wavelength domain, but narrower required wavelength coverage. It should also be noted that in an array such as that illustrated in FIG. 4, the reflectivity of each reflector is intended to be quite weak, (e.g., of order 1%) to allow subsequent array elements to receive an acceptable optical power for their interrogation. The optimum reflectivity will depend on the number of elements to be included and it would be possible to increase the reflectivity for more remote elements, relative to the near-end elements in order to achieve a better equalization of received power for all elements.

In still other embodiments, other types of reflectors may be used, such as reflective splices or tap couplers with the tap port being coated to form a mirror.

Returning to the embodiments illustrated in FIGS. 5 and 6, as the light progresses along the sensor array, it experiences an increasing path imbalance between the two polarization states and the periodicity in the frequency domain becomes shorter. Eventually, these effects may result in the returned light falling below the frequency resolution of the interrogation and acquisition systems. In such a case, and as shown in FIG. 7, the sense of the incremental birefringence may be reversed by exchanging the fast and slow axes of the birefringent fiber by placing a splice 260 which rotates the fiber axes by 90 degrees with respect to one another. In this arrangement, the path imbalance gradually increases until the light reaches the splice. After the splice, the path imbalance decreases. For particularly long arrays, multiple splices may be used to ensure that useful information may be acquired along most of the length of the sensing fiber.

Figure 8:
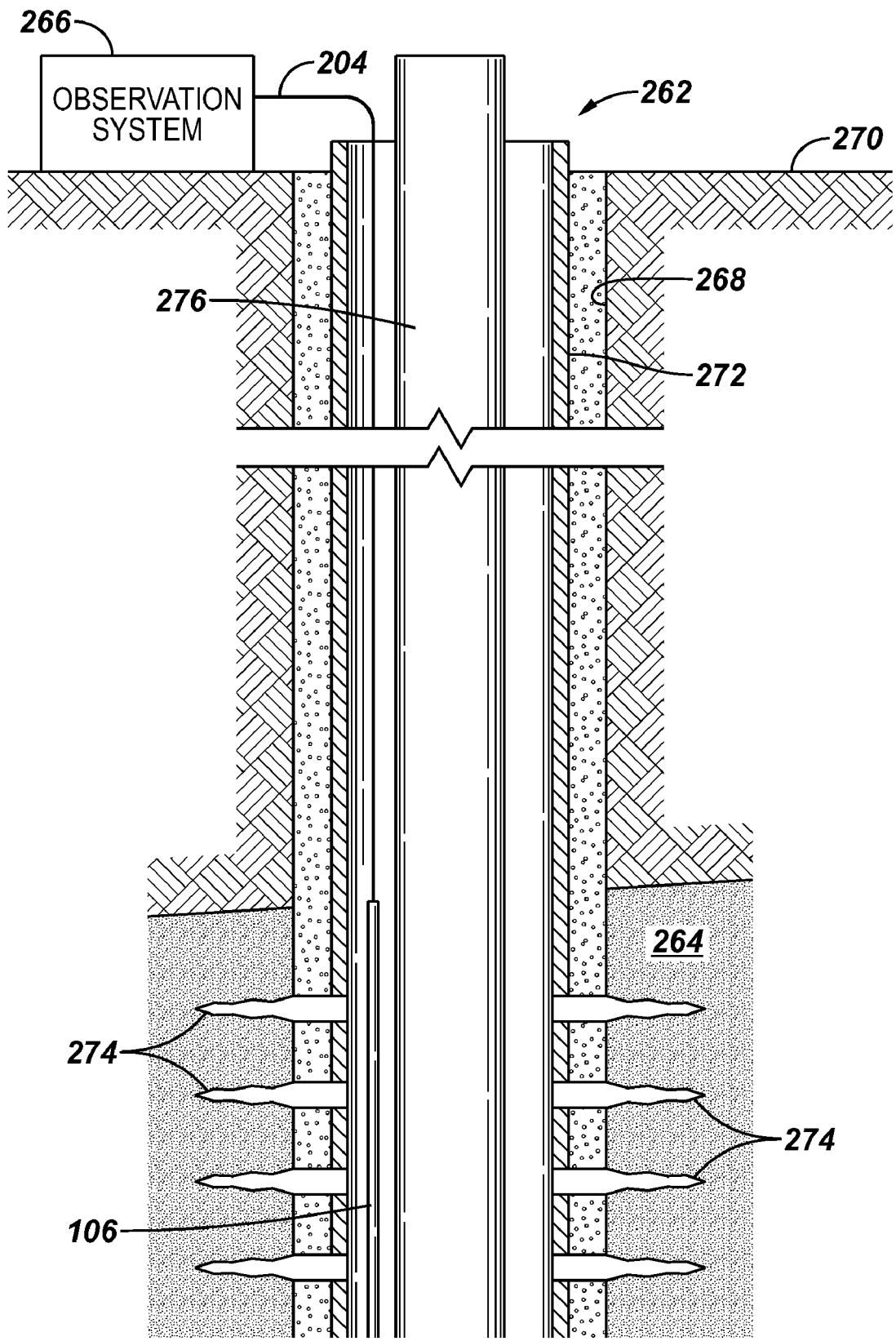
FIG. 8 is a diagram of a sensor array deployed in a well, in accordance with an embodiment of the invention.

The systems and techniques described above may be particularly suited to applications in the gas or oilfield, as illustrated in FIG. 8. In FIG. 8, the sensor array_is deployed in a well 262 to observe physical parameters associated with a region of interest 264. In some embodiments, the down lead fiber 204 (or 134 or 250) and sensor array 140 (or 106) may be deployed through a control line. An observation system 266 coupled to the fiber 204 is configured to transmit interrogating pulses, detect returned optical signals, and acquire and process the data to determine the observed physical parameters from the detected signals in the manner described above.

In the embodiment illustrated in FIG. 8, to reach the region of interest 264, a well bore 268 is drilled through a surface 270 and a casing 272 is lowered into the bore 268. Perforations 274 are created through the casing 272 to establish fluid communication between the well bore 268 and the formation in the region of interest 264 around the perforations 274. A production tubing 276 is then installed and set in place such that production of fluids through the tubing 276 can be established. Although a cased well structure is shown, embodiments of the present invention may not be limited to this illustrative example. Un-cased, open hole, gravel packed, deviated, horizontal, multi-lateral, deep sea or terrestrial surface injection and/or production wells (among others), may incorporate an observation system as previously described.

In many such applications, temperature and pressure profiles obtained from the region of interest 264 may provide useful information that may be used to enhance production. For example, the use of temperature profiles acquired using conventional production logging, and more recently, distributed temperature sensors, is known to provide, through a variety of interpretation methods, detailed information on the in-flow profile (in producing wells), and the infectivity profile (in injection wells).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of determining a physical parameter associated with a region of interest, comprising:
    launching a plurality of optical pulses at a plurality of wavelengths into an optical sensor array having a plurality of interferometric sensors disposed at a plurality of locations within a region of interest;
    receiving a plurality of wavelength-dependent signals produced by the plurality of interferometric sensors in response to the optical pulses;
    based on a transit time between each launching of an optical pulse and detecting a wavelength-dependent signal produced by the interferometric sensors in response to the launched optical pulse, determining a contribution of each interferometric sensor to each of the received wavelength-dependent signals;
    determining optical path length imbalances associated with the interferometric sensors based on the determined contributions; and
    determining a physical parameter at the plurality of locations within the region of interest based on the determined optical path length imbalances.

2. The method as recited in claim 1, wherein launching the optical pulses comprises launching a second optical pulse at a second wavelength after receiving the wavelength-dependent signal produced by the interferometric sensors in response to a first optical pulse launched at a first wavelength.

3. The method as recited in claim 1, wherein the optical sensor array comprises a birefringent optical fiber having a first polarization axis and a second polarization axis.

4. The method as recited in claim 3, wherein the optical pulses are launched into the sensor array at approximately 45 degrees to each of the first and second polarization axes.

5. The method as recited in claim 4, wherein the physical parameter is pressure.

6. The method as recited in claim 5, further comprising determining temperature at the plurality of locations in the region of interest.

7. The method as recited in claim 6, wherein the optical pulses cover a first optical wavelength range and a second optical wavelength range, and wherein determining temperature comprises:
    launching the optical pulses covering the second optical wavelength range along the first and second polarization axes of the birefringent fiber; and
    detecting second wavelength-dependent pulses produced in response to the optical pulses covering the second optical wavelength range.

8. The method as recited in claim 1, further comprising providing the optical sensor array in a wellbore.

9. A system for determining a physical parameter associated with a region of interest, comprising:
    an optical sensor array comprising a plurality of interferometric sensors disposed at a plurality of locations within a region of interest;
    an optical source for launching a plurality of optical pulses into the sensor array at a plurality of optical wavelengths; and
    an acquisition and processing system coupled to the optical sensor array and configured to analyze returned signals produced in response to the optical pulses to determine each sensor's contribution to the returned signals based on a transit time between launching an optical pulse and receiving a returned signal in response to the optical pulse, and to determine an optical path length imbalance associated with each sensor based on each sensor's contribution, the acquisitions and processing system further configured to determine at least one physical parameter at the locations in the region of interest based on the optical path length imbalances.

10. The system as recited in claim 9, wherein the sensor array is a birefringent fiber having a first axis of polarization and a second axis of polarization.

11. The system as recited in claim 10, further comprising a polarizer coupled to the sensor array to polarize the optical pulses so that the optical pulses are launched at approximately 45 degrees to each of the first and second axes of polarization.

12. The system as recited in claim 11, wherein the at least one physical parameter is pressure.

13. The system as recited in claim 11, wherein the at least one physical parameter is pressure and temperature.

14. The system as recited in claim 9, wherein the sensor array is deployed in a wellbore.

15. The system as recited in claim 9, wherein the interferometric sensors are polarimetric sensors.

16. A method for determining a physical parameter in a region of interest, comprising:

launching a plurality of optical pulses into an optical sensor array having a plurality of interferometric sensors disposed at a plurality of locations in a region of interest;

analyzing, in a time domain, returned signals produced in response to the optical pulses to determine each sensor's contribution to the returned signals;

analyzing, in a wavelength domain, each sensor's determined contribution to determine an optical path length imbalance associated with each sensor; and determining a physical parameter at the plurality of locations in the region of interest based on the optical path length imbalances.

17. The method as recited in claim 16, wherein the optical sensor array comprises a birefringent fiber having a first axis of polarization and a second axis of polarization.

18. The method as recited in claim 17, wherein the power of the optical pulses launched into the birefringent fiber is approximately the same along each of the first and second axes of polarization.

19. The method as recited in claim 16, wherein the optical sensor array comprises a plurality of discrete polarimetric sensors.

* * * * *